(12) United States Patent
Mumbauer et al.

(10) Patent No.: US 9,299,184 B2
(45) Date of Patent: Mar. 29, 2016

(54) SIMULATING PERFORMANCE OF VIRTUAL CAMERA

(75) Inventors: Michael Mumbauer, San Diego, CA (US); Thomas Bland, San Diego, CA (US)

(73) Assignee: SONY COMPUTER ENTERTAINMENT AMERICA LLC, San Mateo, CA (US)

(*) Notice: Subject to any disclaimer, the term of this patent is extended or adjusted under 35 U.S.C. 154(b) by 935 days.

(21) Appl. No.: 12/419,880

(22) Filed: Apr. 7, 2009

(65) Prior Publication Data

US 2010/0253676 A1    Oct. 7, 2010

(51) Int. Cl.
| | |
|---|---|
| *G06T 15/00* | (2011.01) |
| *G06T 15/10* | (2011.01) |
| *G06G 5/00* | (2006.01) |
| *A63F 9/24* | (2006.01) |
| *G06F 3/048* | (2013.01) |
| *G06K 9/00* | (2006.01) |
| *G06K 9/36* | (2006.01) |
| *G06T 15/20* | (2011.01) |
| *A63F 13/40* | (2014.01) |

(Continued)

(52) U.S. Cl.
CPC .............. *G06T 15/20* (2013.01); *A63F 13/10* (2013.01); *G06F 3/04815* (2013.01); *G06T 19/00* (2013.01); *G09G 5/14* (2013.01); *H04N 5/232* (2013.01); *H04N 5/262* (2013.01); *H04N 5/2224* (2013.01)

(58) Field of Classification Search
CPC ....... G06T 19/00; G06T 15/20; G06T 19/006; G06T 2207/10016; G06T 7/0042; A63F 13/00; G06F 3/04815; G06K 9/036

USPC .............. 345/419, 427, 629–641; 463/30–34; 715/781, 782, 848–851; 382/103, 154, 382/181, 276, 286, 289, 291
See application file for complete search history.

(56) References Cited

U.S. PATENT DOCUMENTS 5,963,203 A    10/1999    Goldberg
6,072,504 A    6/2000    Segen
(Continued)

FOREIGN PATENT DOCUMENTS

CN    101010700 A    8/2007
JP    2001-285715    10/2001
(Continued)

OTHER PUBLICATIONS

International Search Report and Written Opinion issued in corresponding PCT/US2009/061180 on Dec. 7, 2009.

*Primary Examiner* — Phi Hoang
*Assistant Examiner* — Andrew Shin
(74) *Attorney, Agent, or Firm* — Procopio, Cory, Hargreaves & Savitch, LLP

(57) ABSTRACT

Simulating performance of a virtual camera operating inside a 3-D environment having scenes generated for motion pictures and video games including: tracking position and orientation of an object within a physical volume of space; placing the virtual camera within the virtual 3-D environment corresponding to the tracked position of the object within the physical volume of space; capturing shots within a field of view of the virtual camera, wherein the field of view of the virtual camera is measured in accordance with the tracked position and orientation of the object; and displaying the captured shots of the 3-D environment captured with the virtual camera.

37 Claims, 11 Drawing Sheets

(51) Int. Cl.
  *G06F 3/0481* (2013.01)
  *G09G 5/14* (2006.01)
  *G06T 19/00* (2011.01)
  *H04N 5/232* (2006.01)
  *H04N 5/262* (2006.01)
  *H04N 5/222* (2006.01)

(56) References Cited

U.S. PATENT DOCUMENTS

| | | | |
|---|---|---|---|
| 6,292,215 B1 | 9/2001 | Vincent | |
| 6,856,935 B1* | 2/2005 | Fehlis et al. | 702/152 |
| 7,070,277 B2 | 7/2006 | Trumbull | |
| 2004/0104935 A1* | 6/2004 | Williamson et al. | 345/757 |
| 2006/0038890 A1* | 2/2006 | MacIntosh et al. | 348/211.99 |
| 2007/0248283 A1* | 10/2007 | Mack et al. | 382/284 |
| 2008/0012866 A1* | 1/2008 | Forbes | 345/473 |
| 2008/0129825 A1* | 6/2008 | DeAngelis et al. | 348/169 |
| 2009/0046152 A1* | 2/2009 | Aman | 348/157 |
| 2009/0237564 A1* | 9/2009 | Kikinis et al. | 348/584 |

FOREIGN PATENT DOCUMENTS

| | | |
|---|---|---|
| WO | 2006023153 A1 | 3/2006 |
| WO | 2006023156 A1 | 3/2006 |

* cited by examiner

SIMULATING PERFORMANCE OF VIRTUAL CAMERA

BACKGROUND

1. Field of the Invention

The present invention relates to motion pictures and video games, and more specifically, to simulating performance of a virtual camera operating inside scenes generated for such motion pictures and video games.

2. Background

Motion capture systems are used to capture the movement of real objects and map them onto computer generated objects. Such systems are often used in the production of motion pictures and video games for creating a digital representation that is used as source data to create a computer graphics (CG) animation. In a session using a typical motion capture system, an actor wears a suit having markers attached at various locations (e.g., having small reflective markers attached to the body and limbs) and digital cameras record the movement of the actor. The system then analyzes the images to determine the locations (e.g., as spatial coordinates) and orientations of the markers on the actor's suit in each frame. By tracking the locations of the markers, the system creates a spatial representation of the markers over time and builds a digital representation of the actor in motion. The motion is then applied to a digital model, which may then be textured and rendered to produce a complete CG representation of the actor and/or performance. This technique has been used by special effects companies to produce realistic animations in many popular movies and games.

SUMMARY

The present invention provides for simulating performance of a virtual camera operating inside a 3-D environment having scenes generated for motion pictures and video games.

In one embodiment, a method for simulating performance of a virtual camera operating inside a 3-D environment is disclosed. The method including: tracking position and orientation of an object within a physical volume of space; placing the virtual camera within the virtual 3-D environment corresponding to the tracked position of the object within the physical volume of space; capturing shots within a field of view of the virtual camera, wherein the field of view of the virtual camera is measured in accordance with the tracked position and orientation of the object; and displaying the captured shots of the 3-D environment captured with the virtual camera.

In another embodiment, a method for simulating movement of a virtual camera in a virtual environment is disclosed. The method including: receiving a video file including the virtual environment; tracking a physical camera operated by a camera operator to generate position and orientation of the physical camera; simulating the movement of the virtual camera within the virtual environment using the generated position and orientation of the physical camera.

In another embodiment, a system for simulating performance of a virtual camera operating inside a 3-D environment is disclosed. The system including: a position tracker configured to track position of a physical camera operating within a physical volume of space; an orientation tracker configured to track orientation of the physical camera; a processor including a storage medium storing a computer program comprising executable instructions that cause said processor to: receive a video file including the virtual environment; track a physical camera operated by a camera operator to generate position and orientation of the physical camera; simulate the movement of the virtual camera within the virtual environment using the generated position and orientation of the physical camera; and a display configured to display the captured shots of the 3-D environment captured with the virtual camera.

In a further embodiment, a computer-readable storage medium storing a computer program for simulating performance of a virtual camera operating inside a 3-D environment having scenes generated for motion pictures and video games is disclosed. The computer program including executable instructions that cause a computer to: track position and orientation of an object within a physical volume of space; place the virtual camera within the virtual 3-D environment corresponding to the tracked position of the object within the physical volume of space; capture shots within a field of view of the virtual camera, wherein the field of view of the virtual camera is measured in accordance with the tracked position and orientation of the object; and display the captured shots of the 3-D environment captured with the virtual camera.

Other features and advantages of the present invention will become more readily apparent to those of ordinary skill in the art after reviewing the following detailed description and accompanying drawings.

DETAILED DESCRIPTION

Certain embodiments as disclosed herein provide for methods and systems for simulating the performance of a virtual camera operating inside the scenes generated for motion pictures and video games. In some embodiments, the generated scenes are computer animation scenes generated from motion capture sessions described above. The performance of the virtual camera is simulated using a physical camera which includes all of the typical camera control functions such as Record, Playback, Rewind, and Fast-Forward, as well as Pan, Translation, Rotation, Zoom, and other similar functions.

After reading this description it will become apparent how to implement the invention in various embodiments and applications. However, although various embodiments of the present invention will be described herein, it is understood that these embodiments are presented by way of example only, and not limitation. As such, this detailed description of various embodiments should not be construed to limit the scope or breadth of the present invention.

Figure 5:
FIG. 5 shows an example scene in a video game including a fully-rendered movie.
Figure 6:
FIG. 6 shows an example end-game cinematic shot in which players are kept in first person points of view.

With the advent of technology that provides more realistic and life-like animation (often in 3-D environment), the video games are becoming more of an interactive entertainment than just a game. Motion capture sessions (similar to one shown in FIG. 7) use a series of motion capture cameras to capture markers on the bodies of actors, translate the captured markers into a computer, apply them onto skeletons to generate graphical characters, and add life-like features onto the graphical characters (see FIG. 8). In order for the players to get immersed in the game world, they need to stay involved in the story. By simulating the performance of a virtual camera operating inside the scenes generated for the video games (e.g., using motion capture camera in a motion capture session), two forms of cinematic shots are presented to the players: a fully-rendered movie (e.g., see FIG. 5); and end-game cinematic shots (e.g., see FIG. 6) in which the players are kept in first person points of view to try to keep them immersed in the game.

Figure 1:
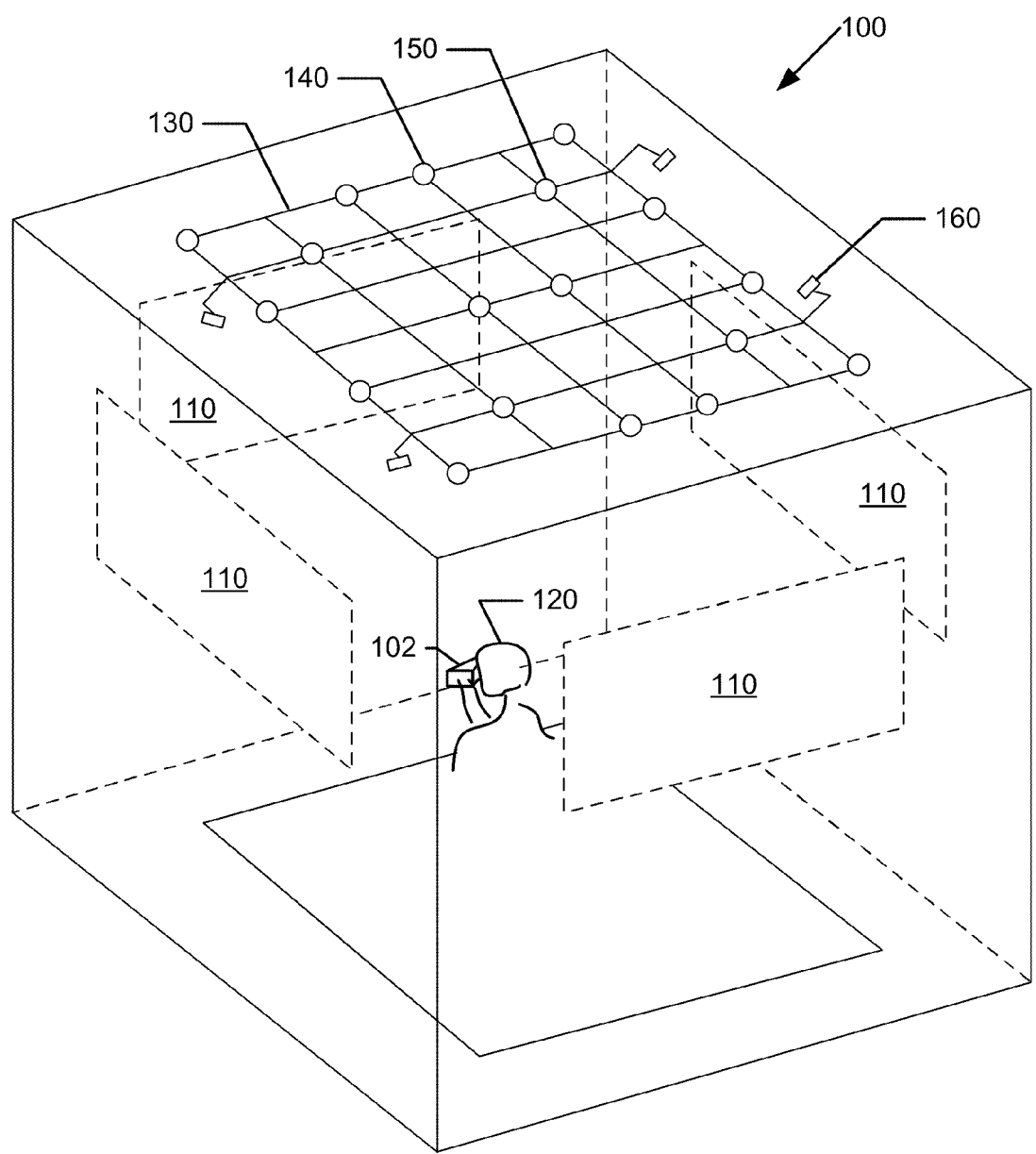
FIG. 1 shows a physical volume of space for tracking a physical camera to simulate performance of a virtual camera operating within scenes generated for motion pictures and video games.
Figure 2:
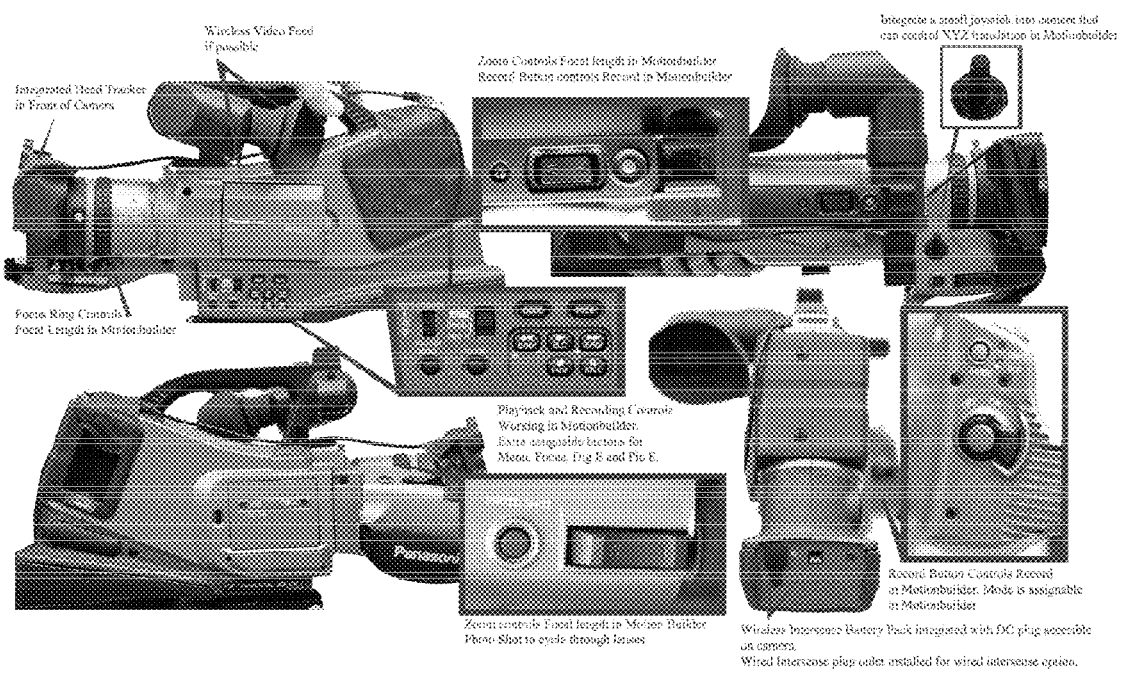
FIG. 2 shows one example of a physical video camera including different control functions.
Figure 10:
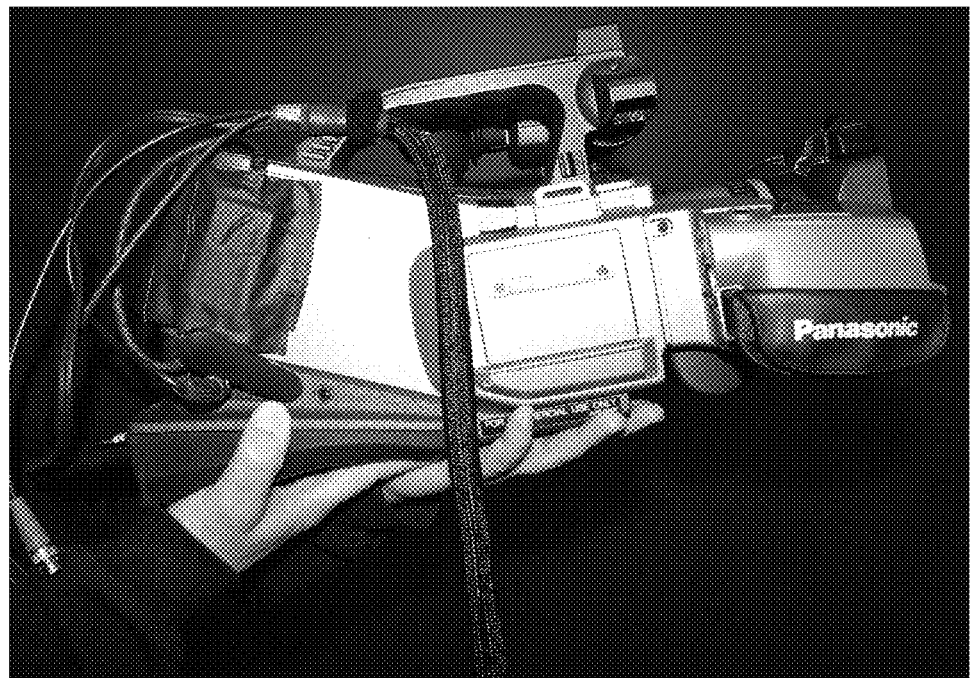
FIG. 10 shows another view of the physical video camera shown in FIG. 2.
Figure 11:
FIG. 11 shows another implementation of a physical camera.

In one embodiment, shown in FIG. 1, position and orientation of an object is tracked within a physical volume of space 100 to simulate the performance of a virtual camera operating within the scenes generated for motion pictures and video games ("3-D environment"). In one configuration, the object is a physical video camera 102 having camera control functions such as pan, tilt, roll, pitch, yaw, translation, zoom, focus, playback, record, and other similar control functions. FIG. 2 shows one example of a physical video camera including different control functions. FIG. 10 shows another view of the physical video camera. FIG. 11 shows another implementation of the physical camera.

Figure 7:
FIG. 7 shows one example of several different camera angles showing a motion capture session.
Figure 8:
FIG. 8 shows one example shot in which life-like features are added onto the graphical characters.

In one embodiment, the generated scenes in the 3-D environment are initially captured with film cameras and/or motion capture cameras, processed, and delivered to the physical video camera. FIG. 7 shows one example of several different camera angles showing a motion capture session. In an alternative embodiment, the scenes are generated by computer graphics (e.g., using keyframe animation).

In the illustrated embodiment of FIG. 1, the position of the video camera 102 is tracked using position trackers 140 attached to the ceiling. In the illustrated embodiment of FIG. 1, the supports for the trackers 140 are laid out in a grid pattern 130. The trackers 140 can also be used to sense the orientation of the video camera 102. However, in a typical configuration, accelerometers or gyroscopes attached to the camera 102 are used to sense the orientation of the camera.

Figure 3:
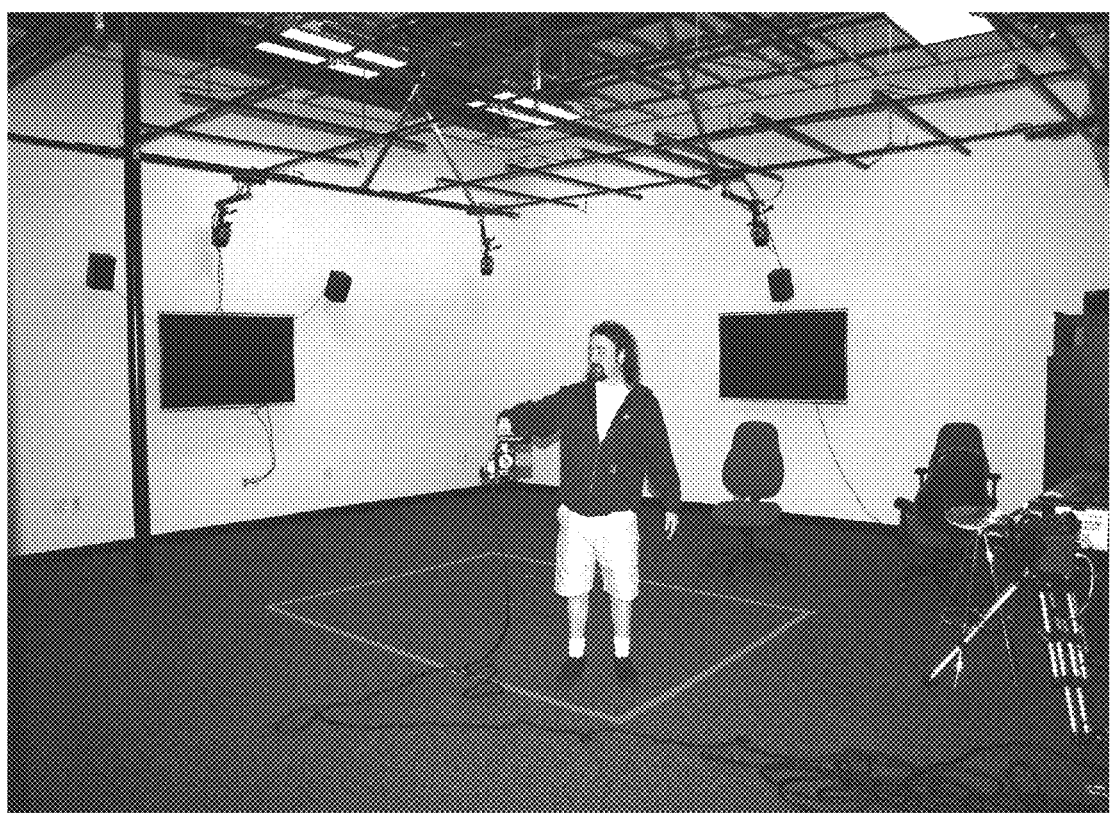
FIG. 3 shows one example setup of the physical volume of space.

Once the scenes for the 3-D environment are generated, the camera 102 is simulated as a virtual camera operating within the 3-D environment by placing the virtual camera within the 3-D environment corresponding to the tracked position of the camera 102 within the physical volume of space 100. Then, cinematic shots are captured within the field of view of the virtual camera, which is measure in accordance with the tracked orientation of the camera 102. A camera operator captures (or 'creates') cinematic shots desired by the director and stores the created cinematic shots into a computer. The created shots are displayed on the eye piece of the video camera 102 and/or transmitted to the monitors 110 positioned on the walls of the physical volume of space 100. Thus, the process of 'creating' the cinematic shots includes: delivering the generated scenes to the physical camera 102; tracking the position and orientation of the camera 102 within the physical volume of space 100; placing the virtual camera within the 3-D environment corresponding to the tracked position of the physical camera 102 within the physical volume of space 100; capturing shots within the field of view of the virtual camera, wherein the field of view of the virtual camera is measured in accordance with the tracked orientation of the camera 102; and displaying the captured shots of the 3-D environment within the field view of the virtual camera for viewing through the eye piece of the camera 102 and/or the monitors 110. The captured shots can be delivered and displayed on the video camera by wire or wirelessly. FIG. 3 shows one example setup of the physical volume of space 100.

In summary, a system for simulating performance of a virtual camera operating inside a 3-D environment is described. The system includes a position tracker, an orientation tracker, a processor, and a display. The position tracker is configured to track position of a physical camera operating within a physical volume of space. The orientation tracker is configured to track orientation of the physical camera. The processor includes a storage medium storing a computer program including executable instructions. The executable instructions cause the processor to: (1) place a virtual camera within a 3-D environment having scenes generated for motion picture or video games, wherein the virtual camera is placed within the 3-D environment corresponding to the tracked position of the physical camera operating within the physical volume of space; and (2) capture shots within a field of view of the virtual camera, wherein the field of view of the virtual camera is measured in accordance with the tracked orientation of the physical camera. The display is configured to display the captured shots of the 3-D environment captured with the virtual camera.

Figure 9:
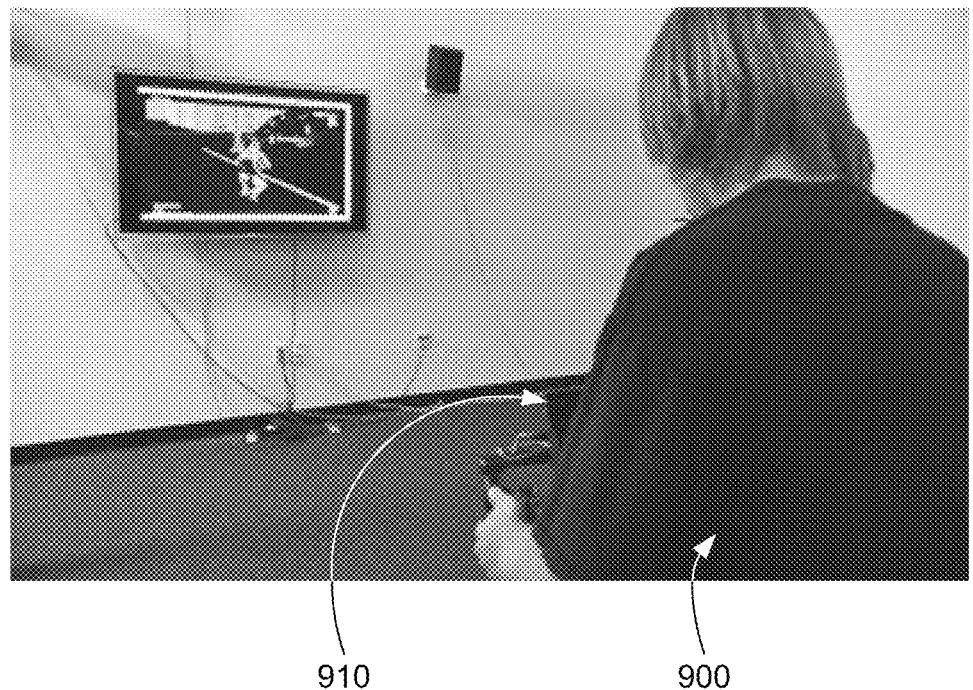
FIG. 9 shows a camera operator holding a physical camera and operating within the physical volume of space.

As described above, the virtual camera simulated in the 3-D environment complements the motion capture cameras by enabling a camera operator to move forward, away from, and around the motion captured (or keyframe animated) characters or objects to create a realistic first person point of view of the 3-D environment. For example, FIG. 9 shows a camera operator 900 holding a physical camera 910 and operating within the physical volume of space (e.g., 100 in FIG. 1). Since the camera 910 is being position tracked by trackers above the ceiling and orientation tracked by sensors attached to the camera 910, those tracked information is transmitted to the processor, and the processor sends back a video representing the view and movement of the virtual camera within the 3-D environment. This video is displayed on the monitors on the wall and the display (e.g., an eye piece) attached to the physical camera 910.

Before the simulation of the virtual camera was made available through different embodiments of the present invention described above, motion capture sessions (or animation keyframe sessions) involved deciding where the cameras were going to be positioned and directing the motion capture actors (or animated characters) to move accordingly. However, with the availability of the techniques described above, the position and angle of the cameras can be decided after the motion capture session (or animation keyframe session) is completed. Further, since the virtual camera simulation session can be performed in real-time, multiple virtual camera simulation sessions can be performed and recorded before selecting a particular take that provides best camera movement and angle. The sessions are recorded so that each session can be evaluated and compared with respect to the movement and angle of the camera. In some cases, multiple virtual camera simulation sessions can be performed on each of the several different motion capture sessions to select a best combination.

In another embodiment, a live action motion capture session is integrated into the 3-D environment 100 in which the virtual camera 102 is placed. In this embodiment, the movement of the markers worn by actor(s) (not shown) are illuminated by illumination sources 150 and recorded by digital cameras 160. In an alternative embodiment, digital cameras 160 record the movement of the markers directly without the need for illumination sources 150. The digital representation of actor(s) in motion in the 3-D environment is then integrated into the generated scenes. Thus, in this embodiment, the camera operator 120 views the created shots including the motion captured actor(s) in the 3-D environment. In another embodiment, multiple virtual camera simulation sessions are performed in which a different live action motion capture session is performed for each of the multiple virtual camera simulation sessions.

In another embodiment, the physical camera setup is configured on a dolly to move the camera in a smooth motion that provides a feel for a realistic motion picture filming session. In a further embodiment, the video camera 102 includes a camera zooming control function which provides zooming capability for varying or adjusting the placement of the virtual camera in the 3-D environment. For example, the virtual camera can be placed in an aerial or close-up view by using this zooming control function. Thus, in one example, aerial shots of the 3-D environment can be taken when the virtual camera is placed in an aerial view. In another example, running close-up shots (e.g., with camera jitters) of the 3-D environment can be taken when the camera is placed in a close-up view. In this embodiment, the placement of the virtual camera in the 3-D environment can be adjusted so that the position of the virtual camera can be scalable. For example, the camera in the physical volume can be moved 3 feet to move the virtual volume in the 3-D environment 3 feet or 3 miles, depending on the scale. The scalability allows creation of wide variety of shots including helicopter shots, crane shots, and hand held camera shots.

In these examples, a physical camera is placed in the hands of a camera operator to create cinematic shots desired by the director, and to store the created cinematic shots into a computer. Thus, these cinematic shots (i.e., shots made by a camera operator) are created using post-processed motion capture session scenes, computer-generated scenes, or film camera scenes (i.e., scenes made from actor performances). This allows the director to run multiple passes at creating cinematic shots from the post-processed scenes until desired shots are obtained without having the actors to perform multiple takes.

Figure 4:
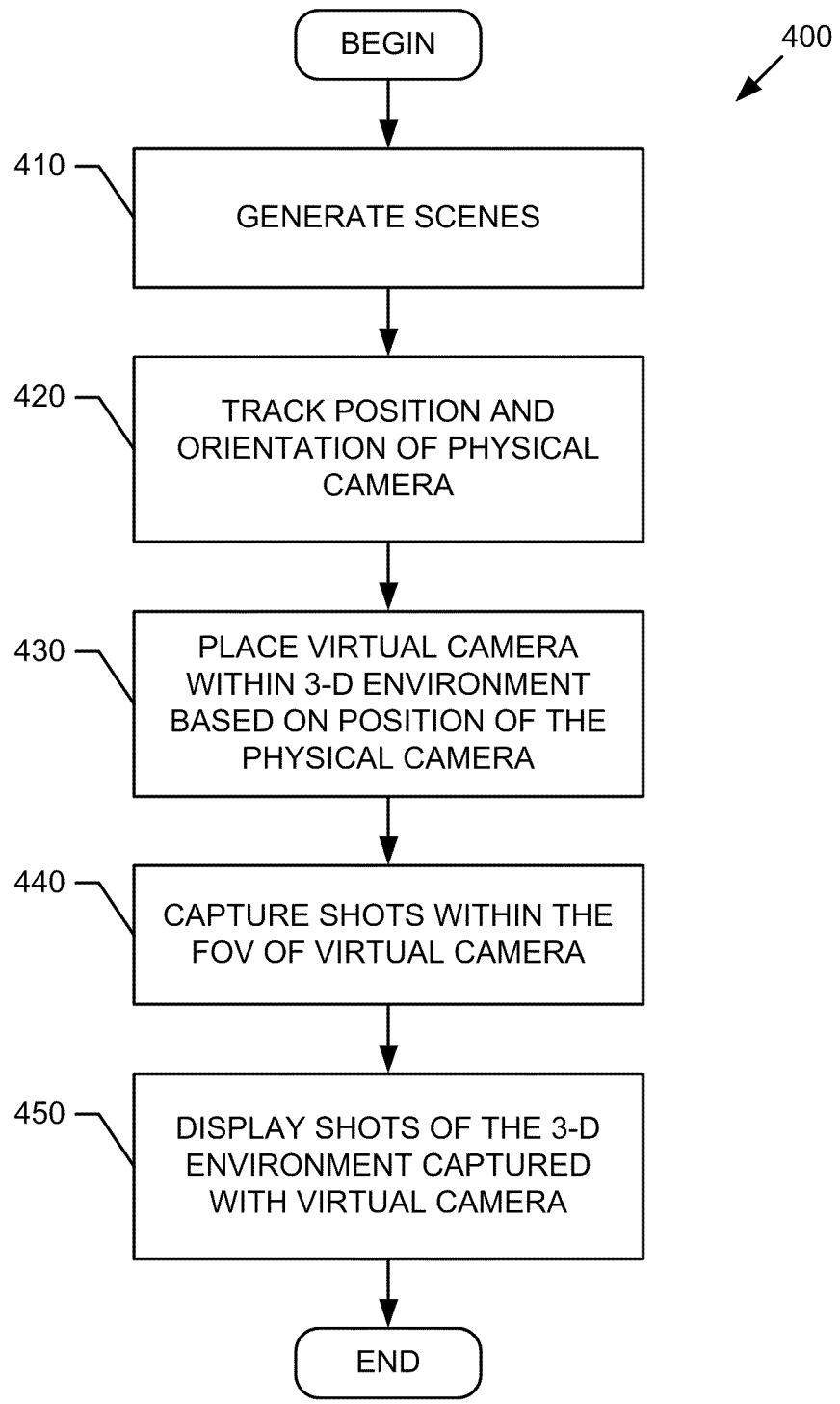
FIG. 4 is a flowchart illustrating a process for simulating performance of a virtual camera operating inside scenes generated for motion pictures and video games.

FIG. 4 is a flowchart 400 illustrating a process for simulating performance of a virtual camera operating inside scenes generated for motion pictures and video games in accordance with one embodiment. In the illustrated embodiment of FIG. 4, the scenes are generated, at box 410. The scenes are generated by capturing them with film cameras or motion capture cameras, processed, and delivered to the physical camera 102. At box 420, the position and orientation of the camera 102 is tracked within a physical volume of space. As discussed above, in one example implementation, the position of the camera 102 is tracked using position trackers 140 laid out in a grid pattern 130 attached to the ceiling. Trackers 140 or accelerometers/gyroscopes attached to the camera 102 can be used to sense the orientation. The physical camera 102 is tracked for position and orientation so that the position and rotation of the camera 102 is properly simulated into the movements of the virtual camera.

The virtual camera is then placed within the 3-D environment, at box 430, corresponding to the tracked position of the camera 102 within the physical volume of space 100. By placing the virtual camera within the 3-D environment corresponding to the tracked position of the camera 102, the camera 102 is simulated as a virtual camera operating within the 3-D environment. Cinematic shots within the field of view (FOV) of the virtual camera are captured, at box 440, using inputs from the control functions of the physical camera 102 including its position and orientation. Thus, the FOV of the virtual camera is measured in accordance with the tracked orientation of the physical camera 102. The captured shots of the 3-D environment captured with the virtual camera are displayed, at box 450, for viewing. In the embodiments discussed above, the captured shots are either displayed on the eye piece of the camera 102 and/or the monitors 110.

In an alternative embodiment, the entire camera tracking setup within a physical volume of space is a game in which a player plays the part of a camera operator following an action generated within the game. The setup includes: a processor for coordinating the game; a position tracker that can be mounted on a ceiling; a direction tracker (e.g., accelerometers, gyroscopes, etc.) coupled to the camera held by the player; and a recording device coupled to the processor to record the cinematic shots of the action shot by the player. In one configuration, the processor is a game console such as Sony Playstation®.

The description herein of the disclosed embodiments is provided to enable any person skilled in the art to make or use the invention. Numerous modifications to these embodiments would be readily apparent to those skilled in the art, and the principals defined herein can be applied to other embodiments without departing from the spirit or scope of the invention. For example, although the specification describes simulating the performance of the virtual camera using a physical camera, any object that can be tracked can be used to simulate the virtual camera. In another example, although the specification describes simulating performance of a camera-like object operating within the scenes generated for motion pictures and video games, the object can be simulated to be operating within other applications such as concerts, parties, shows, and property viewings. In another example, more than one physical object can be tracked to simulate interactions between the objects (e.g., two cameras tracked to simulate a fighting scene between two players, where each player has different movement and angle of view). Thus, the invention is not intended to be limited to the embodiments shown herein but is to be accorded the widest scope consistent with the principal and novel features disclosed herein.

Various implementations of the invention are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

The invention claimed is:

1. A method for generating first person video sequences for motion pictures and video games from previously recorded scenes of a virtual 3-D environment, the method comprising:
    simulating performance of a virtual camera operating inside the previously recorded scenes, comprising:
        tracking position and orientation of an object and one or more characters within a physical volume of space, wherein a display is coupled to the object;
        placing and moving the virtual camera within the previously recorded scenes corresponding to the tracked position of the object within the physical volume of space;
        capturing shots within the previously recorded scenes from a field of view of the virtual camera, wherein the field of view of the virtual camera is measured in accordance with the tracked position and orientation of the object; and
    displaying the captured shots of the virtual 3-D environment captured with the virtual camera on the display coupled to the object,
    wherein the captured shots displayed on the display are usable by an operator of the object to:
        determine where and which direction to move the object; and
        enable the operator to move forward, away from, or around the one or more characters within the captured shots and the previously recorded scenes,
    wherein the operator of the object interacts with other actors and objects within the physical volume of space and the previously recorded scenes to generate the first person video sequences.

2. The method of claim 1, wherein the object is a physical video camera having camera control functions including zoom, focus, playback, and record.

3. The method of claim 2, wherein one of the camera control function includes a scalability control to adjust the placement of the virtual camera in the virtual 3-D environment.

4. The method of claim 2, wherein the physical video camera is configured on a dolly to move the camera in a smooth motion that provides a feel for a realistic motion picture filming session.

5. The method of claim 1, further comprising
    generating the previously recorded scenes of the 3-D environment for motion pictures and video games.

6. The method of claim 5, wherein the previously recorded scenes of the 3-D environment are captured using film cameras.

7. The method of claim 5, wherein the previously recorded scenes of the virtual 3-D environment are captured in a motion capture session.

8. The method of claim 7, further comprising
    performing multiple virtual camera simulation sessions to select a take that provides best camera movement and angle,
    wherein said simulating performance of a virtual camera is a single virtual camera simulation session.

9. The method of claim 8, wherein the multiple virtual camera simulation sessions are recorded so that each session can be evaluated and compared.

10. The method of claim 8, further comprising
    performing multiple motion capture sessions,
    wherein multiple virtual camera simulation sessions are performed for each of the multiple motion capture sessions to select a take that provides best camera movement and angle.

11. The method of claim 1, further comprising
    integrating a live action motion capture session into the previously recorded scenes of the virtual 3-D environment.

12. The method of claim 11, further comprising
    performing multiple virtual camera simulation sessions in which a different live action motion capture session is performed for each of the multiple virtual camera simulation sessions.

13. The method of claim 11, wherein said capturing shots within a field of view of the virtual camera comprises
    capturing shots of actors of the live action motion capture session operating within the previously recorded scenes of the virtual 3-D environment.

14. The method of claim 1, wherein the position of the object is tracked using a plurality of position trackers.

15. The method of claim 1, wherein the orientation of the object is tracked using at least one of accelerometers and gyroscopes attached to the object.

16. The method of claim 1, wherein the captured shots of the 3-D environment are displayed on at least one of an eye piece of the object and monitors positioned on walls of the physical volume of space.

17. A method for generating a first person video sequence within previously recorded scenes of a virtual environment, comprising:
    tracking a physical camera to generate position and orientation of the physical camera within a physical volume of space;
    simulating the movement of the virtual camera within the virtual environment based on the generated position and orientation of the physical camera, the virtual environment comprising a previously captured 3-D video sequence;

generating shots within a field of view of the virtual camera, wherein the field of view of the virtual camera is measured in accordance with the tracked position and orientation of the physical camera; and displaying the generated shots of the virtual environment captured with the virtual camera on a display of the physical camera, using the generated shots displayed on the display of the physical camera to: determine where and which direction to move the physical camera; and enable the camera operator to move forward, away from, or around characters and objects within the generated shots and previously captured 3-D video sequence, interacting with other actors and objects within the physical volume of space and the virtual 3-D environment to generate the first person video sequence.

18. The method of claim 17, further comprising
moving substantially freely within the virtual environment to create cinematic shots by the camera operator.

19. The method of claim 17, wherein the video file includes files for a video game.

20. The method of claim 17, wherein creating cinematic shots includes capturing cinematic shots within a field of view of the virtual camera,
wherein the field of view is measured with respect to the position and orientation of the physical camera.

21. The method of claim 17, wherein the physical camera has camera control functions including zoom, focus, playback, and record.

22. The method of claim 21, wherein one of the camera control function includes a scalability control to adjust a field of view of the virtual camera in the virtual environment.

23. The method of claim 17, further comprising
performing multiple virtual camera simulation sessions to select a take that provides best camera movement and angle,
wherein said simulating movement of a virtual camera is a single virtual camera simulation session.

24. The method of claim 23, wherein the multiple virtual camera simulation sessions are recorded so that each session can be evaluated and compared.

25. The method of claim 23, further comprising
performing multiple motion capture sessions,
wherein multiple virtual camera simulation sessions are performed for each of the multiple motion capture sessions to select a take that provides best camera movement and angle.

26. A system for generating a first person video sequence within previously recorded scenes of a virtual environment, comprising:
a position tracker configured to track position of a physical camera operating within a physical volume of space;
an orientation tracker configured to track orientation of the physical camera within the physical volume of space;
a processor including a storage medium storing a computer program comprising executable instructions that cause said processor to:
track the physical camera to generate position and orientation of the physical camera within the physical volume of space;
simulate the movement of the virtual camera within the previously recorded scenes based on the generated position and orientation of the physical camera;
generate shots within a field of view of the virtual camera, wherein the field of view of the virtual camera is measured in accordance with the tracked position and orientation of the physical camera within the previously recorded scenes; and
a display coupled to the physical camera and configured to display the generated shots of the virtual environment captured with the virtual camera,
wherein the generated shots displayed on the display are usable by an operator to: determine where and which direction to move the physical camera; and enable the camera operator to move forward, away from, or around characters and objects within the generated shots and previously recorded scenes,
wherein the camera operator of the object interacts with other actors and objects within the physical volume of space and the virtual environment to generate the first person video sequence.

27. The system of claim 26, wherein said processor is a game console configured to receive inputs from the physical camera, the position tracker, and the orientation tracker.

28. The system of claim 26, wherein said orientation tracker includes at least one of accelerometers and gyroscopes coupled to the physical camera.

29. The system of claim 26, wherein the display includes an eye piece of the camera.

30. The system of claim 26, wherein the physical camera is configured on a dolly to move the camera in a smooth motion that provides a feel for a realistic motion picture filming session.

31. The system of claim 26, wherein the physical camera includes camera control functions including zoom, focus, playback, and record.

32. The system of claim 26, wherein one of the camera control function includes a scalability control to adjust the placement of the virtual camera in the virtual environment.

33. A non-transitory computer-readable storage medium storing a computer program for generating a first person video sequence within previously recorded scenes of a virtual 3-D environment, the computer program comprising executable instructions that cause a computer to:
track position and orientation of an object and one or more characters within a physical volume of space, wherein a display is coupled to the object;
place and move the virtual camera within the previously recorded scenes corresponding to the tracked position of the object within the physical volume of space;
capture shots within a field of view of the virtual camera within previously recorded scenes of the virtual 3-D environment,
wherein the field of view of the virtual camera is measured in accordance with the tracked position and orientation of the object; and
display the captured shots of the virtual 3-D environment captured with the virtual camera on the display coupled to the object,
wherein the captured shots displayed on the display are usable by an operator of the object to:
determine where and which direction to move the object; and
enable the operator to move forward, away from, or around the one or more characters within the captured shots and the previously recorded scenes,
wherein the operator of the object interacts with other actors and objects within the physical volume of space and the virtual 3-D environment to generate the first person video sequence.

34. The non-transitory computer-readable storage medium of claim 33, further comprising executable instructions that cause a computer to generate previously recorded scenes of the 3-D environment for motion pictures and video games.

35. The non-transitory computer-readable storage medium of claim 33, further comprising executable instructions that cause a computer to integrate a live action motion capture session into the previously recorded scenes of the 3-D environment.

36. The non-transitory computer-readable storage medium of claim 35, wherein executable instructions that cause a computer to capture shots within a field of view of the virtual camera comprise executable instructions that cause a computer to capture shots of actors of the live action motion capture session operating within the previously recorded scenes of the 3-D environment.

37. The non-transitory computer-readable storage medium of claim 35, wherein executable instructions that cause a computer to place the virtual camera within the 3-D environment comprises executable instructions that cause a computer to adjust the placement of the virtual camera in the 3-D environment using a camera zooming control function.

\* \* \* \* \*